March 15, 1949.　　　W. N. ALLYN　　　2,464,547
RETINOSCOPE
Filed May 20, 1946　　　2 Sheets-Sheet 1
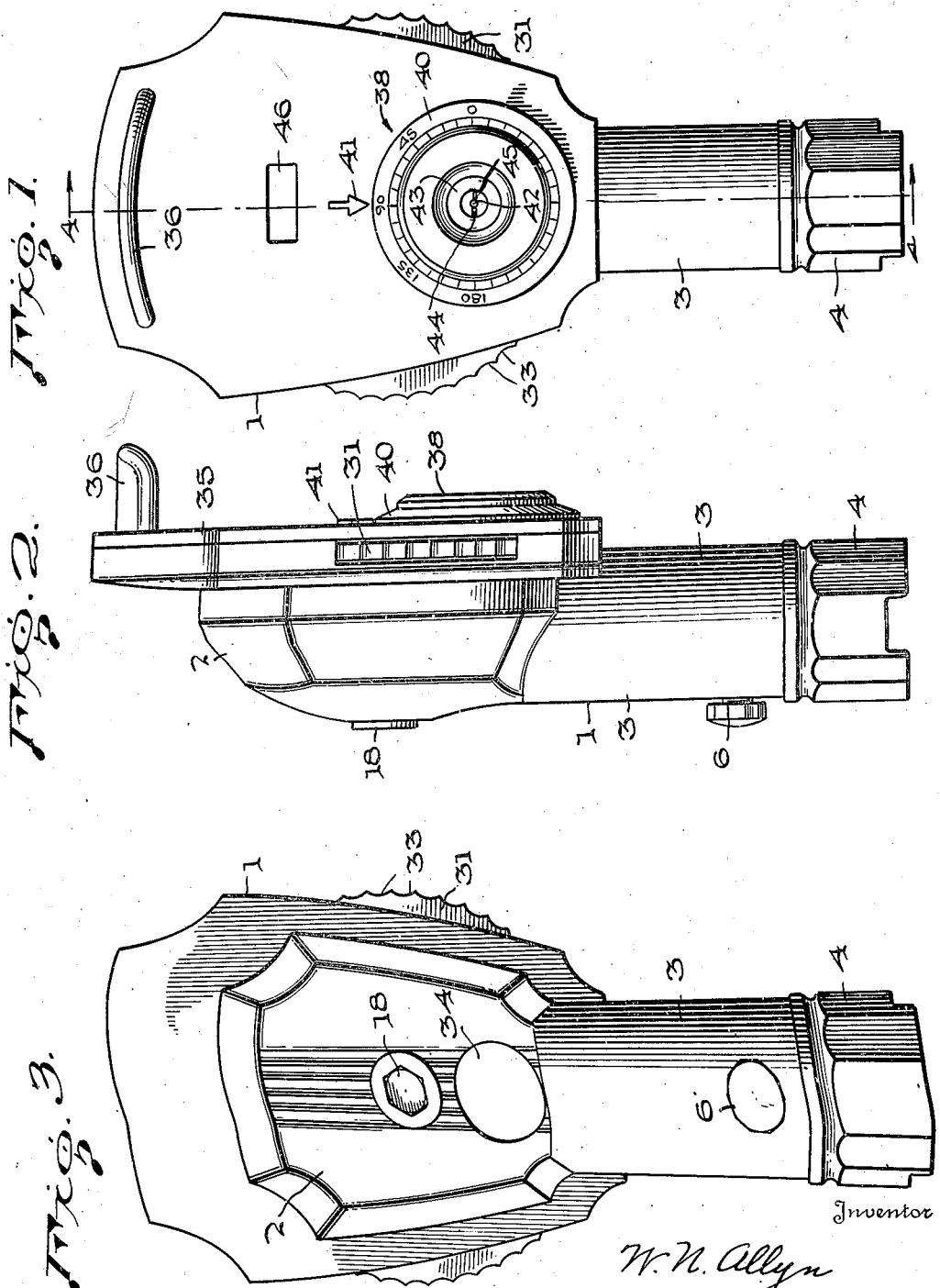
Inventor
W. N. Allyn
By Robb & Robb
Attorneys Patented Mar. 15, 1949

2,464,547

UNITED STATES PATENT OFFICE 2,464,547

RETINOSCOPE

William N. Allyn, Skaneateles, N. Y., assignor to Welch Allyn, Inc., Auburn, N. Y., a corporation of New York Application May 20, 1946, Serial No. 670,922

10 Claims. (Cl. 88—20)

The present invention relates to diagnostic instruments, and more especially to instruments for examining and testing the eyes, such as retinoscopes, ophthalmoscopes, and the like.

It is well known that by directing a beam of light into the eye from a predetermined distance, a shadow will be cast on the eye cord, by means of which certain pathological and organic conditions of the eye may be detected.

The primary object of the invention is to provide a simple, compact and efficient instrument by means of which light rays may be directed into the eye for the purpose of detecting conditions such as myopia (nearsightedness), hypermetrophia (farsightedness), astigmatism, and the like.

In carrying out the aforementioned objectives, the invention contemplates the provision of selective means for varying the intensity and/or form of the light rays.

According to the preferred form of the diagnostic instrument, the instrument includes a source of light, such as a small electric lamp, together with a plurality of reflecting means which may be selectively brought into cooperation with the light source to direct the light rays therefrom into the eye, said reflecting means having different characteristics such that the reflected light rays may be varied in selective stages from a "soft" light to a very strong or brilliant light, and at the same time, providing for an unobstructed line of sight through the instrument so as to permit observation of the eye of the subject under examination.

Another object of the invention is to provide adjustable means for indicating the axis of astigmatism, if present.

A still further object of the invention is to provide a diagnostic instrument of the type above referred to, which preferably has the form of a unitary head capable of detachable connection with either a portable battery handle of the self-contained power source type, or with any other suitable source of electrical energy.

Other and further objects and advantages of the invention will be hereinafter described and the novel features thereof defined in the appended claims.

In the drawings:

Figure 1 is a view in front elevation of a diagnostic instrument embodying the present invention, as seen when looking towards the face of the instrument which is towards the observer when the instrument is in use;

Figure 2 is a view of the instrument in side elevation;

Figure 3 is a view in rear elevation, as seen from the face which is towards the subject when in use;

Figure 4 is a vertical sectional view taken on the line 4—4 of Figure 1;

Figure 5 is a detail view of the mirror assembly as seen in front elevation;

Figure 6 is a sectional view through the combined mirror assembly and its rotatable actuator means, and Figure 7 is a diagrammatic view illustrating the manner of use of the split mirror.

Like reference characters designate corresponding parts in the several figures of the drawings. While the instrument may have any suitable form, in the preferred form as illustrated in the drawing, it has the form of a unitary head which may be detachably connected to a battery handle (not shown), or to any other suitable source of electrical energy. The head includes a frame generally designated 1 which may be made of metal, Bakelite, or any other suitable material. As seen in front elevation, the frame has the form of a shield, but it is to be understood that the shield shape is not essential to the present invention. The frame is extended rearwardly for a substantial distance as indicated at 2, and the interior thereof is hollow for the purpose of providing a housing for suitable reflecting instrumentalities mounted therein. The lower end of the frame 1 is extended downwardly from the housing 2 in the form of a cylindrical sleeve 3.

Attached to the lower end of the sleeve 3 is a coupling member 4, the upper portion of which is slidably received within the sleeve as best seen at 5 in Figure 4. A set screw 6 extends through the sleeve 3 and has threaded engagement therewith for the purpose of detachably clamping the coupling member 4 to the sleeve. By loosening the set screw 6, the coupling member may be both rotatively as well as slidably adjusted relative to the sleeve 3.

The extreme lower end of the coupling member 4 is provided with suitable means for permitting detachable interlocking engagement with complementary interlocking means on the battery handle above referred to. The details of these interlocking instrumentalities are not material to the present invention, and hence will not be further described. The upper portion 5 of the coupling member 4 is provided with a lamp socket 7 for receiving a small electric lamp 8 which projects somewhat above the member 5. Telescopically fitting over the upper end of the member 5 is a ferrule 9 which extends upwardly above engagement with a flexible spring nut 39' at the inner face of the cover plate 35, said spring nut permitting rotation of the sleeve. At its forward end, the member 38 terminates in the form of a circular dial 40, the margin of which is preferably graduated in degrees, the graduations being selectively registrable with a suitable index or reference point, such as arrow 41 denoted on the front face of the cover plate. The member 38 is provided with a central opening of progressively decreasing size from front to back. At the rear of said member 38, and extending transversely across the central opening therethrough is a flat end wall having a sight opening 42 therein at the center thereof. At one side of the sight opening 42, the end wall is provided with a plurality of small perforations 44 having the appearance of dots, and at the diametrically opposite side of the sight opening 42, the end wall is provided with a small slit 45 having the appearance of a line, as best seen in Figure 1 of the drawings. When an observation is made through the sight opening 42, the dots and slit 44 and 45 will have the appearance of continuations of each other in a single line extending diametrically across the sight opening 42 and intersecting the axis thereof in alignment with the zero point of the graduated dial 40.

The cover plate 35 is also provided with an aperture 46 located above the pivotal axis of the rotatable mirror assembly, the purpose of this aperture being to enable the operator to determine the position of the respective mirrors.

In the use of the instrument, the head is first connected to a battery handle or other means for supporting the same, the connection being established by the coupling member 4. When so connected, an electrical circuit is established between the lamp 8 and the batteries in the battery handle, or any other convenient source of electrical energy, as the case may be. Before commencing the examination of the eye of a subject, the operator first selects one of the mirrors to be used during the examination, according to the type of examination to be made, and according to the intensity and form of the illumination desired. The selection of the mirror is attained by rotating the actuator member or ring 31 which projects from opposite sides of the instrument head, and hence is conveniently accessible for engagement by the fingers of the operator. In making the mirror selection, the mirror assembly is rotated until the selected mirror assumes its lowermost position, in which position, the selected mirror will lie between the sight openings 34 and 42 respectively at the back and at the front of the instrument. In this position, the selected mirror is disposed immediately above the condensing lens 12 so that the light rays from the lamp 8, after passing through the condensing lens, will strike the mirror and thence be reflected rearwardly through the sight opening 34 and into the eye of the subject.

After selecting the proper mirror for the particular examination to be performed, and assuming the lamp 8 has been energized, the instrument is held in an upright position with the brow rest 36 firmly resting against the operator's brow over the eye which is aligned with the sight openings 42 and 34. As the examination continues, the mirrors may be changed as desired by quickly shifting the actuator member 31 by the fingertips of the hand in which the instrument is held by the operator, and without removing the instrument from on front of the operator's eyes. Since the mirrors are all built into the instrument in the form of a unitary assembly and thus become a permanent part thereof, the substitution of one mirror for another can be quickly effected by a simple rotative movement of the mirror assembly. This eliminates the use of independently detachable mirrors, and consequent independent handling of the mirrors such as would tend to leave finger prints on the mirrors.

It is to be understood that while four mirrors have been shown in the drawings and described above, the number can be varied from two upward, within practical limits, and depending upon the size of the instrument. With four mirrors of the type shown in the drawings and described above, the mirror 26 permits complete examination of the eye with controlled illumination of the field, while mirror 24 may be used to soften the illumination when desired. By selecting mirror 27, partial light reflection can be attained, with the advantages of eliminating double image and shadow of the usual viewing aperture, and makes squinting unnecessary. When mirror 23 is selected, a full beam of light is reflected as diagrammatically illustrated by the heavy dotted lines in Figure 7, while the operator views the illuminated field through the clear or transparent portion 23''' of the mirror between the reflecting surfaces 23' and 23'', as represented by the dashed lines in Figure 7.

In making the examination for astigmatism, when present, the graduated dial 40 which surrounds the sight opening 42 may be rotated until the openings 44 and 45 assume a position coinciding with the shadow of the astigmatism. When the dial is so adjusted, the angle of the astigmatism may be quickly determined by reading the graduations on the dial.

It will be apparent from the foregoing that retinoscopes constructed in accordance with the present invention are particularly useful in confirming or determining errors of refraction. It is especially advantageous in the attainment of accurate results where the subject or patient being examined is illiterate or speaks a foreign tongue.

While the specific details have been herein shown and described, the invention is not confined thereto as changes and alterations may be made without departing from the spirit thereof as defined by the appended claims.

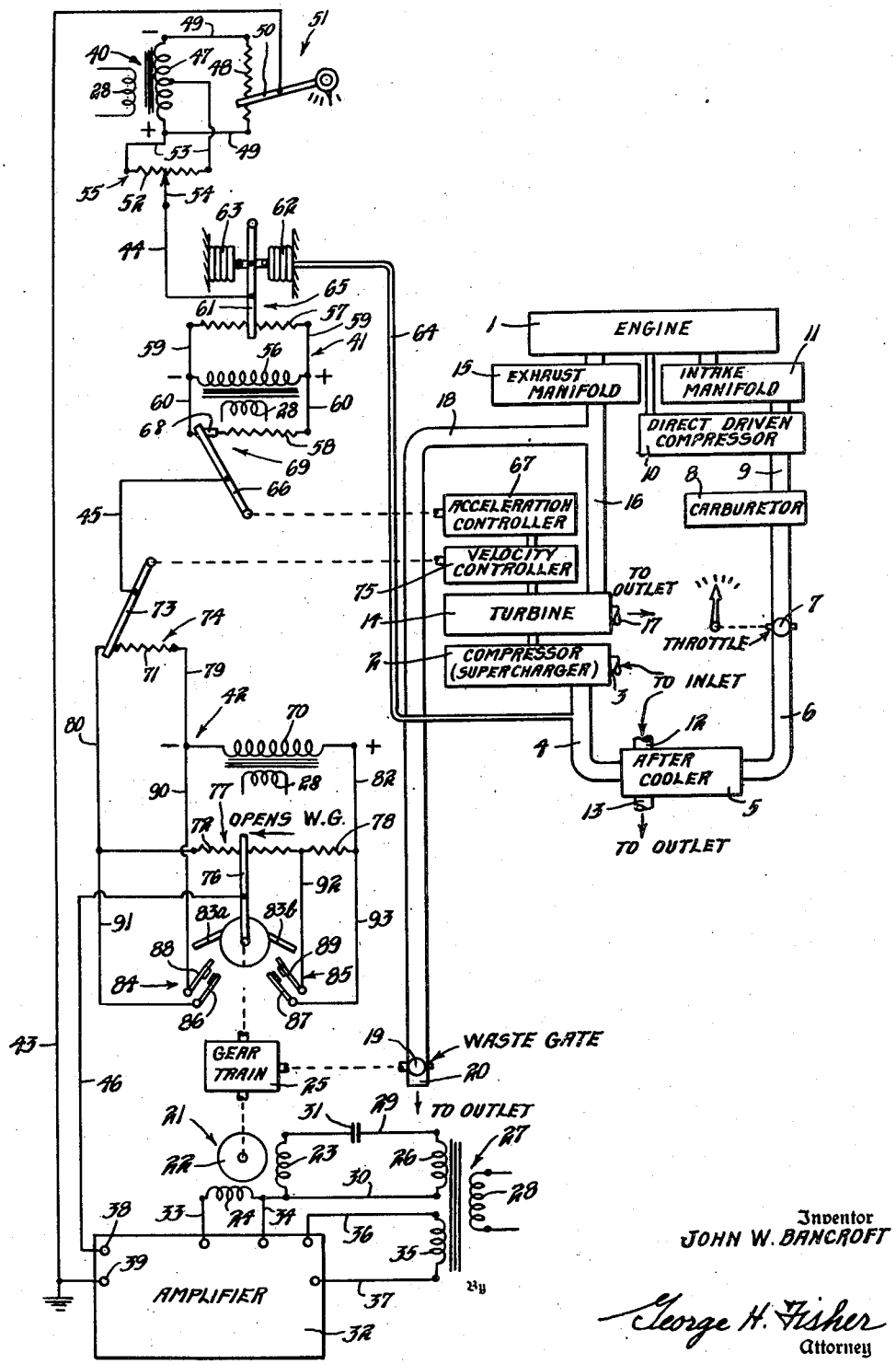

I claim:

1. In a diagnostic instrument of the class described, comprising a frame having an enlarged cavity in the back thereof constituting a housing, said frame being downwardly extended below the cavity aforesaid in the form of a tubular sleeve, a coupling member adjustably connected to the lower end of said sleeve, with the upper portion of the coupling member telescopically received within the sleeve, and a lamp mounted in the upper end of the coupling member and disposed within the sleeve, the combination of a plurality of light-reflecting mirrors through which a subject may be observed, said mirrors being disposed in the said cavity aforesaid above the lamp and in the path of the light rays from the lamp, and being assembled in the form of a rotatable unit for rotation about a horizontal axis, with the mirrors inclined forwardly at an angle of about 45° to said axis, said frame having an opening at the back through which the light rays reflected by a selected mirror are directed rearwardly from the instrument when the selected mirror is shifted to its lowest position about the axis of rotation of the mirror unit, and a cover plate mounted on the frame at the front side thereof and extending over the cavity housing the mirror unit, the cover plate having a sight opening therethrough disposed in alignment with the opening aforesaid at the back of the frame.

2. A diagnostic instrument as defined in claim 1, wherein one of the mirrors is provided with spaced reflecting surfaces defining a laterally extended transparent viewing area therebetween at the central portion of the same.

3. A diognastic instrument as defined in claim 1, wherein the sight opening in the cover has the form of a hollow tubular member which is rotatably mounted on the cover, said tubular member being provided with a graduated dial, the graduations of which are selectively registrable with a reference point on the cover.

4. A diagnostic instrument as defined in claim 1, wherein the sight opening in the cover has the form of a hollow tubular member which is rotatably mounted on the cover, said tubular member being provided with a graduated dial, the graduations of which are selectively registrable with a reference point on the cover, the hollow tubular member being interiorly tapered.

5. A diagnostic instrument as defined in claim 1, wherein the sight opening in the cover has the form of a hollow tubular member which is rotatably mounted on the cover, said tubular member being provided with a graduated dial, the graduations of which are selectively registrable with a reference point on the cover, the hollow tubular member being interiorly tapered and provided with an end wall having a central sight aperture and distinguishable perforations disposed respectively on diametrically opposite sides of the sight aperture.

6. A diagnostic instrument as defined in claim 1, wherein the sight opening in the cover has the form of a hollow tubular member which is rotatably mounted on the cover, said tubular member being provided with a graduated dial, the graduations of which are selectively registrable with a reference point on the cover, the hollow tubular member being interiorly tapered and provided with an end wall having a central sight aperture and distinguishable perforations disposed respectively on diametrically opposite sides of the sight aperture, said perforations bearing a fixed relation to the graduations of the dial.

7. A diagnostic instrument as defined in claim 1, wherein the cover plate is provided with a brow rest at the upper end thereof and projecting forwardly therefrom, in combination with yieldable cushioning means for the brow rest.

8. A diagnostic instrument as defined in claim 1, wherein the sight opening through the cover plate has the form of a tubular member rotatively mounted in the cover plate with its central axis aligned with the opening in the back of the frame and substantially co-centered with the selected mirror of the rotatable mirror unit, said tubular member being provided at its forward end with a graduated dial lying against the front face of the cover plate.

9. A diagnostic instrument as defined in claim 1, wherein the rotatable mirror unit is provided with an actuator ring mounted on the forward end thereof, said actuator ring extending laterally beyond the cover plate at the opposite sides thereof for convenient access to the finger tips of the user's hand in selectively positioning the mirrors of the rotatable mirror unit in an operative light-reflecting position.

10. A diagnostic instrument as defined in claim 1, in combination with adjustable indicator means on the support for indicating the axis of astigmatism when the same is observed in the field illuminated by a selected light directing means.

WILLIAM N. ALLYN.

REFERENCES CITED

The following references are of record in the file of this patent:

UNITED STATES PATENTS

| Number | Name | Date |
| --- | --- | --- |
| 1,776,960 | Turville et al | Sept. 30, 1930 |
| 1,804,151 | Copeland | May 5, 1931 |
| 1,852,837 | Desmond et al | Apr. 5, 1932 |
| 2,080,844 | Witting | May 18, 1937 |
| 2,331,591 | Arnesen | Oct. 12, 1943 |